(12) United States Patent  (10) Patent No.: US 8,601,777 B2
Monti                                (45) Date of Patent:     Dec. 10, 2013

(54) MACHINE FOR PACKING VIALS

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 400 days.

(21) Appl. No.: 13/156,805

(22) Filed: Jun. 9, 2011

(65) Prior Publication Data

US 2011/0302883 A1     Dec. 15, 2011

(30) Foreign Application Priority Data

Jun. 14, 2010 (IT) ............................. BO2010A0372

(51) Int. Cl.
*B65B 3/00* (2006.01)
(52) U.S. Cl.
USPC ................. 53/502; 53/173; 53/266.1; 53/281
(58) Field of Classification Search
USPC ............. 53/173, 266.1, 281, 282, 284.6, 502, 53/534
See application file for complete search history.

(56) References Cited

U.S. PATENT DOCUMENTS

| | | | | |
|---|---|---|---|---|
| 3,429,102 | A * | 2/1969 | Heffner ........................... | 53/333 |
| 4,344,493 | A * | 8/1982 | Salmonsen et al. ............. | 177/52 |
| 4,888,936 | A * | 12/1989 | Takahama et al. ............... | 53/510 |
| 5,806,287 | A * | 9/1998 | Trechsel ......................... | 53/502 |
| 6,800,818 | B2 * | 10/2004 | Balboni et al. .................. | 177/52 |

(Continued)

FOREIGN PATENT DOCUMENTS

| DE | 2605775 A | 8/1977 |
|---|---|---|
| DE | 19937011 A | 2/2001 |

(Continued)

OTHER PUBLICATIONS

European Search Report for EP 2 394 917 A1,Completed Sep. 29, 2011, 3 pages.

*Primary Examiner* — Hemant M Desai
(74) *Attorney, Agent, or Firm* — William J. Sapone; Ware Fressola Maguire & Barber LLP (57) ABSTRACT

A machine (M) for packing vials (F) includes a supply station (1) of empty vials (F) and an Archimedes screw (3) having a rotation axis parallel to a longitudinal development of the machine (M), activated in phase relation with the supply station (1) from which it receives the vials (F). A first device (4) has at least two cogged sectors, rotating on a common axis independently of one another, alternatively activated in phase relation with the screw (3). The machine has a comb conveyor (5), which is step-moved and designed to receive the vials (F) from one or another of the cogged sectors of the first device (4), and a filling station (8), for introduction of a liquid solution contemporaneously into a plurality of vials (F). The machine has a statistical weighing station (10) for the vials (F), arranged in proximity to the filling station (8), able to detect a tare and a gross weight of sample vials (F). A capping station (11) is provided for at least partly sealing a plurality of vials (F). A second sector device (12), configured like the first device (4), has at least two cogged sectors alternatively activated in phase relation with the movement of the comb conveyor (5). A star device (13) is provided, exhibiting a double outlet, a first (U1) and a second (U2), the star device (13) directing conforming vials (F1) towards the first outlet (U1), and rejecting vials (F2) which do not conform to determined requisites by conveying them towards the second outlet (U2).

10 Claims, 8 Drawing Sheets

(56) References Cited

U.S. PATENT DOCUMENTS

| | | |
|---|---|---|
| 7,549,275 B2 * | 6/2009 | Monti ............................. 53/502 |
| 8,359,818 B2 * | 1/2013 | Liu et al. ......................... 53/510 |
| 8,434,611 B2 * | 5/2013 | Monti ........................ 198/479.1 |
| 2005/0150191 A1 * | 7/2005 | Taylor ............................ 53/471 |
| 2006/0086065 A1 * | 4/2006 | Tomalesky et al. ............. 53/425 |
| 2006/0245857 A1 * | 11/2006 | Monti ...................... 414/222.09 |
| 2008/0184668 A1 * | 8/2008 | Monti .............................. 53/53 |
| 2011/0302884 A1 * | 12/2011 | Monti ............................. 53/281 |

FOREIGN PATENT DOCUMENTS

| | | |
|---|---|---|
| EP | 0838275 A | 4/1998 |
| EP | 1695926 A | 8/2006 |
| EP | 1955949 A | 8/2008 |
| EP | 1970306 A | 9/2008 |
| EP | 1988018 A | 11/2008 |

\* cited by examiner

MACHINE FOR PACKING VIALS

This application claims benefit of Italian patent application serial number BO2010A000372, filed Jun. 14, 2010, which is herein incorporated by reference.

FIELD OF THE INVENTION

The present invention relates to the technical sector of automatic machines for packing vials.

DESCRIPTION OF THE PRIOR ART

The prior art comprises packing machines of variously-structured vials, used in various industrial sectors, for example food, cosmetics or pharmaceutical.

SUMMARY OF THE INVENTION

The aim of the invention is that it discloses a machine for packing vials, structured such that the filling thereof which liquid solutions, and the capping of the vials are performed contemporaneously on a plurality of vials, and conformed such as to guarantee both the statistical weighing of the vials and the rejection of the vials which do not conform to predetermined requisites.

A further aim is to provide a machine which if necessary can work in a sterile environment.

A further aim of the present invention is to provide a machine for packing vials which is conformed such as not to interfere with the inserting portion of the caps, used for at least partially sealing the vials.

A further aim of the invention is to realize a machine which, while respecting the preceding aims, are at the same time reliable, functional, and require limited maintenance and enable a productivity that is comparable with that of the known machines.

The above aims are attained with a machine for packing vials as discussed further below.

In accordance with the present invention, the machine for packing vials of the invention comprises, in cascade:

a supply station of empty vials;

an Archimedes screw having a rotation axis parallel to a longitudinal development of the machine, supplied with the vials in arrival from the supply station, and destined to transfer the vials to an outlet thereof, at a predetermined step;

a first device comprising at least two cogged sectors, with an equal step to the step of the screw, which at least two cogged sectors rotate on a same axis independently of one another, and are alternatively activated in phase relation with the screw, in order to receive a predetermined number of vials from the screw;

a comb conveyor, step-moved and designed to receive the vials from one or another of the cogged sectors of the first device, consequently to a suitable phase relation between a velocity of the conveyor and a peripheral velocity of the corresponding cogged sector;

a filling station, designed for introduction of a liquid solution contemporaneously into a plurality of vials, which plurality is equal in number to the predetermined number of vials;

a statistical weighing station of the vials, arranged in proximity of the filling station, able to detect a tare and a gross weight of sample vials of the vials;

a capping station, for at least partly sealing a plurality of vials which plurality is equal to the predetermined number of vials;

a second sector device, conformed like the first device, in which at least two cogged sectors are alternatively activated in phase relation with the movement of the comb conveyor;

a star device, activated in phase relation with the movement of the cogged sector of the second device, which star device is interested by the predetermined number of vials, and exhibits a double outlet, a first outlet and a second outlet;

the star device being destined to direct conforming vials towards the first outlet, and to reject vials which do not conform to determined requisites and to convey them towards the second outlet.

BRIEF DESCRIPTION OF THE DRAWINGS

The characteristics of the invention will better emerge in the following description of a preferred embodiment thereof, in accordance with the contents of the claims and with the aid of the accompanying tables of drawings, in which:

DESCRIPTION OF THE PREFERRED EMBODIMENTS

The machine will be illustrated herein below with reference also to the operating steps of packing the vials, in particular in a case in which the packing of the vials is to be performed in a sterile environment.

As is known, the operating environment suitable for packing sterile vials comprises circulating a laminar flow of sterile air, forced from above in a downwards direction, with the aim of preventing inlet of any polluting particles internally of the vials. The air is then collected and purified using appropriate filters, before being newly circulated from above in a downwards direction in the operating environment.

Figure 1A:
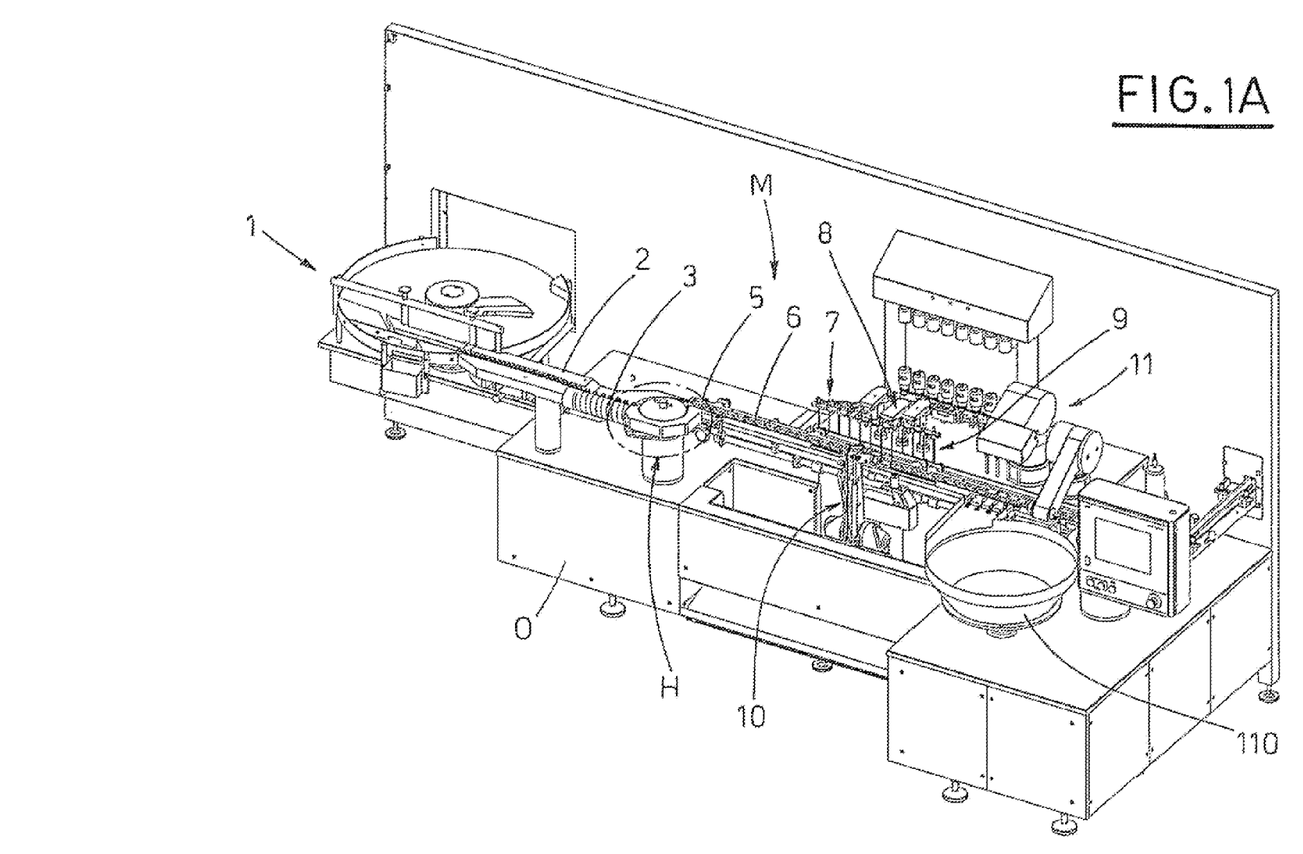
FIG. 1A is a schematic perspective view of the machine for packing vials of the invention.
Figure 1B:
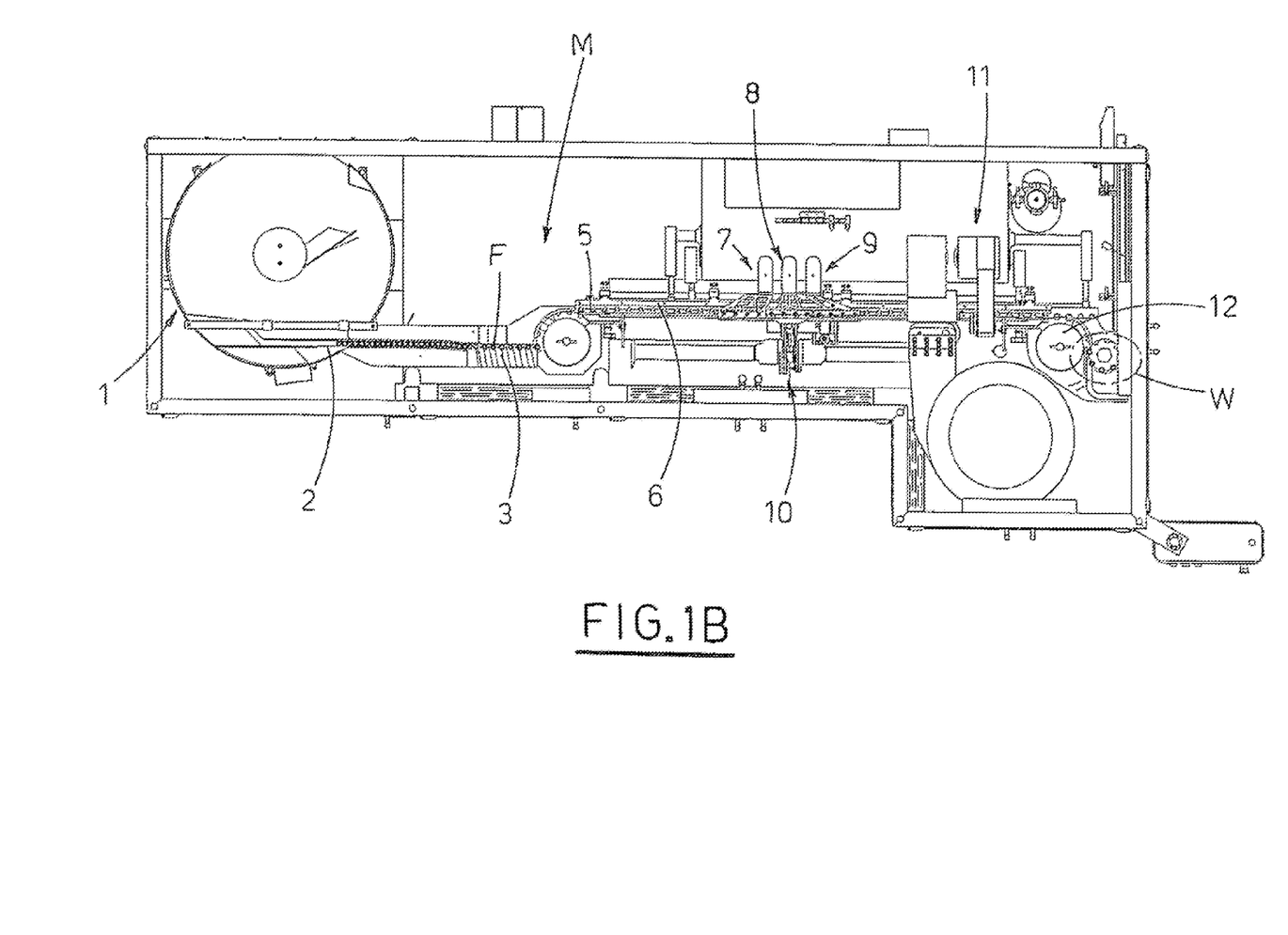
FIG. 1B is a view from above of the machine of FIG. 1A.

With reference to FIGS. 1A, 1B, M denotes the machine for packing the vials F of the invention. The machine M comprises a housing bench O for supporting the various stations and the movement means, which will be described in greater detail herein below.

The machine M comprises a first supply station 1, in which the empty vials F, previously sterilized, are collected and arranged in reciprocal contact with each other.

The vials F are advanced using known systems, such as for example by means of use of a conveyor belt. The outlet zone of the supply station 1 comprises a longitudinal channel 2, towards which the vials F are directed, the vials F being of such dimensions as to be arranged in a line.

The channel 2 transfers the vials F along a sliding plane (not illustrated), without obstructing advancement thereof. The vials F are then transported from the channel 2 up to the entrance of an Archimedes screw 3, appropriately positioned, having a rotation axis thereof that is parallel to the longitudinal development of the machine M.

The screw 3, in movement, enables advancing the vials F, supported inferiorly by the horizontal sliding plane. Further, with the aim of stabilizing the vials F during the sliding along the horizontal plane, an abutting wall E is present, which receives and guides the vials F, and is positioned perpendicularly to the plane and parallel to the rotation axis of the screw 3.

Figure 2:
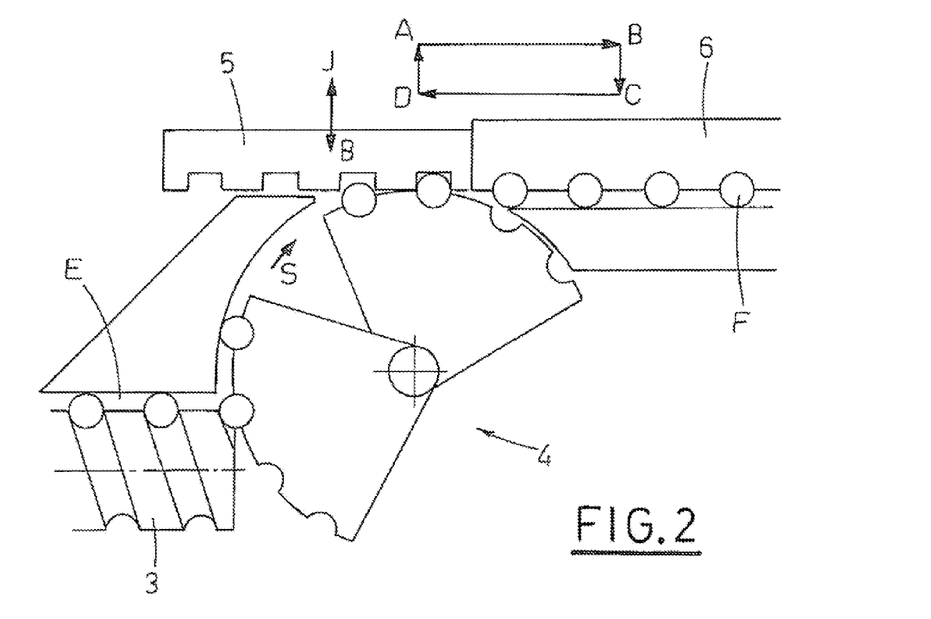
FIG. 2 is a schematic plan view of detail H of FIGS. 1A, 1B.

A device 4 having sectors for transfer of the vials F is appropriately arranged such as to be supplied by the screw 3, and is activated in phase relation therewith (see in particular FIG. 2). The device 4 comprises at least two distinct cogged sectors, independent of each other, which move in a step-fashion, rotating about the same vertical axis, as will be more fully described.

Each cogged sector of the device 4 comprises a determined number N of seatings on the external surface thereof; the number N of seatings corresponds to the number of vials F which are to be worked on contemporaneously. FIG. 2 illustrates a device 4 in which a first and a second cogged sector are present, each having four seatings. The seatings of each of the two cogged sectors, which have the same step as the screw 3, are conformed such as each to receive and retain, with the aid of known technical-functional details (not illustrated), one of the vials F.

The first cogged sector of the device 4, activated by the machine M, is arranged in such a way that when a vial F reaches the terminal part of the screw 3 it occupies one of the seatings of the first sector. The first sector then rotates by a step about the vertical axis, in a determined rotation direction S (clockwise in the figures), with the aim of predisposing a further empty seating to receive a following vial F.

Once all the seatings of the first cogged sector have each received a vial F, the first sector actuates a rotation in the predetermined direction S. At the same time the second cogged sector has undergone a rotation such as to be at the terminal part of the screw 3; the just-described operating cycle is then repeated.

The rotation angle of the first cogged sector in the direction S is such that the vials F, situated up to this moment in the respective seatings, engage, as will be more fully described herein below, between the tines of a comb conveyor 5, arranged for this purpose.

The above-mentioned comb conveyor 5 develops longitudinally over the whole operating line, and is step-supplied by the sector device 4, with which it is activated in phase relation.

The comb conveyor 5 is able to perform a plurality of movements: in the longitudinal direction from left to right (according to the development direction of the line) and vice versa, and also in a vertical direction, from above in a downwards direction and vice versa. These movements are schematically represented in FIG. 2 using arrows (from A to B, from B to C, from C to D, from D to A), in a front view.

The comb conveyor 5, at the moment of receiving the vials F from the sector device 4, rises from position D to position A, until it is at the position of the vials F, at the start of the line. As the cogged sector involved, for example the first sector, i.e. the one whose seatings are interacting with the vials F, has a peripheral velocity which is equal to the movement velocity of the movement of the comb conveyor 5, the rotation in the predetermined direction S of the first sector is such that the four vials F engage between the tines of the comb conveyor 5, which contemporaneously translates in a longitudinal direction. In this way, the first of the tines, which was at the start of the line in position A, now finds itself in position B. The distance between points A and B, reciprocally at the same height, is equal to the run comprising the four vials F moved.

Once the first run has taken place, a second centering comb 6, superposed to the comb conveyor 5, enters into play. The centering comb 6 has the same length as the comb conveyor minus the length of a run, and extends from the height of point B up to the end of the line.

The centering comb 6 is able to move transversally advancingly or backward, while always maintaining the same height. In FIG. 2, arrows (from B to J and vice versa) schematically indicate the movement of the centering comb 6 in a view from above. Following the displacing from A to B of the comb conveyor 5, the centering comb 6, which is initially retracted, advances transversally such that the first of the tines, which was in position J, reaches position B. Thus the vials F are engaged between the tines of the centering comb 6, which stabilizes their position. Once the stability of the vials F is ensured, the comb conveyor 5 moves from above in a downwards direction such that the first of the tines on the left passes from position B to position C. The comb conveyor 5 has therefore disengaged the vials F, which remain housed only between the tines of the centering comb 6.

The comb conveyor 5 can displace longitudinally from right towards left, such that the first of the tines on the left thereof passes from position C to position D, in line with point A. The distance between the points C and D is thus equal to the distance between points A and B.

At this point, the comb conveyor 5 rises vertically and returns to position A, engaging the vials F received from the second sector described above, and, at the same time, the vials F retained by the centering comb 6, previously received from the first sector. In the moment at which the comb conveyor 5 engages the vials F between the tines, the centering comb 6 disengages them, receding from B to J.

The subsequent longitudinal displacement of the comb conveyor 5 causes all the vials F to advance by an operating step. The operating step is N times the step between two consecutive vials, with N defining the predetermined number of vials F which are to be operated on contemporaneously. The movement of the vials F then step-proceeds for the whole line, as described above.

Figure 3A:
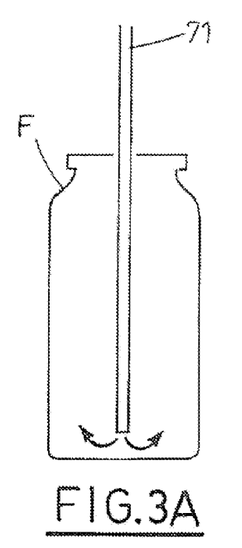
FIG. 3A schematically illustrates injection of an inert gas in the empty vial.

After a series of displacements of the comb conveyor 5, the batch of vials comprising the first four vials F is at a (possible) first inert gas blower station 7. An inert gas is injected into the empty vial F such as to replace the air, preventing oxidation of the liquid which will be injected into it. The first blower station 7, in the preferred embodiment represented herein, comprises four immersion nozzles 71. The nozzles 71, moving vertically in a downwards direction up to reaching the inside of the vials F, inject the inert gas, usually helium or nitrogen. The blowing operation, schematically illustrated in FIG. 3A, is done in phase relation with the movement of the comb conveyor 5, and comprises injection of the inert gas in the period of time in which the vials F are paused. Once the gas has been injected, the nozzles 71 move vertically in an upwards direction such as to return to the starting position.

Figure 3B:
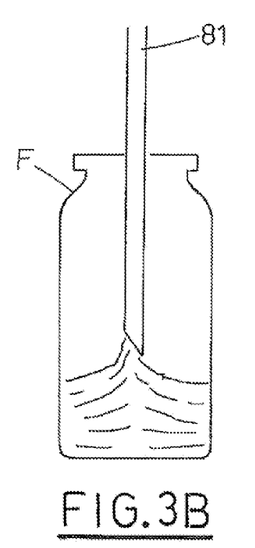
FIG. 3B schematically illustrates filling a vial with a liquid solution.

The four vials F, then translate longitudinally according to the operating step, reach the filling station 8, in which four immersion nozzles 81 inject a liquid solution into the vials F, operating as the blower nozzles 71 described herein above. The schematic illustration of FIG. 3B shows how the vials F are filled with the liquid solution up to a certain height which guarantees correct capping in a following step.

Figure 3C:
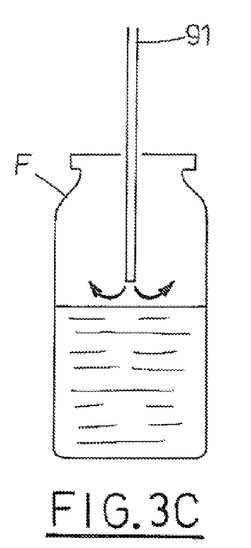
FIG. 3C schematically illustrates injection of an inert gas in a vial filled with a liquid solution.

The full vials F are then taken to a possible second blower station 9, in which four nozzles 91 inject inert gas into the upper part (empty) of the vials F. The nozzles 91 in this case are maintained at a height which is such as not to contact the liquid solution. This is illustrated in the schematic representation of FIG. 3C.

Figure 4:
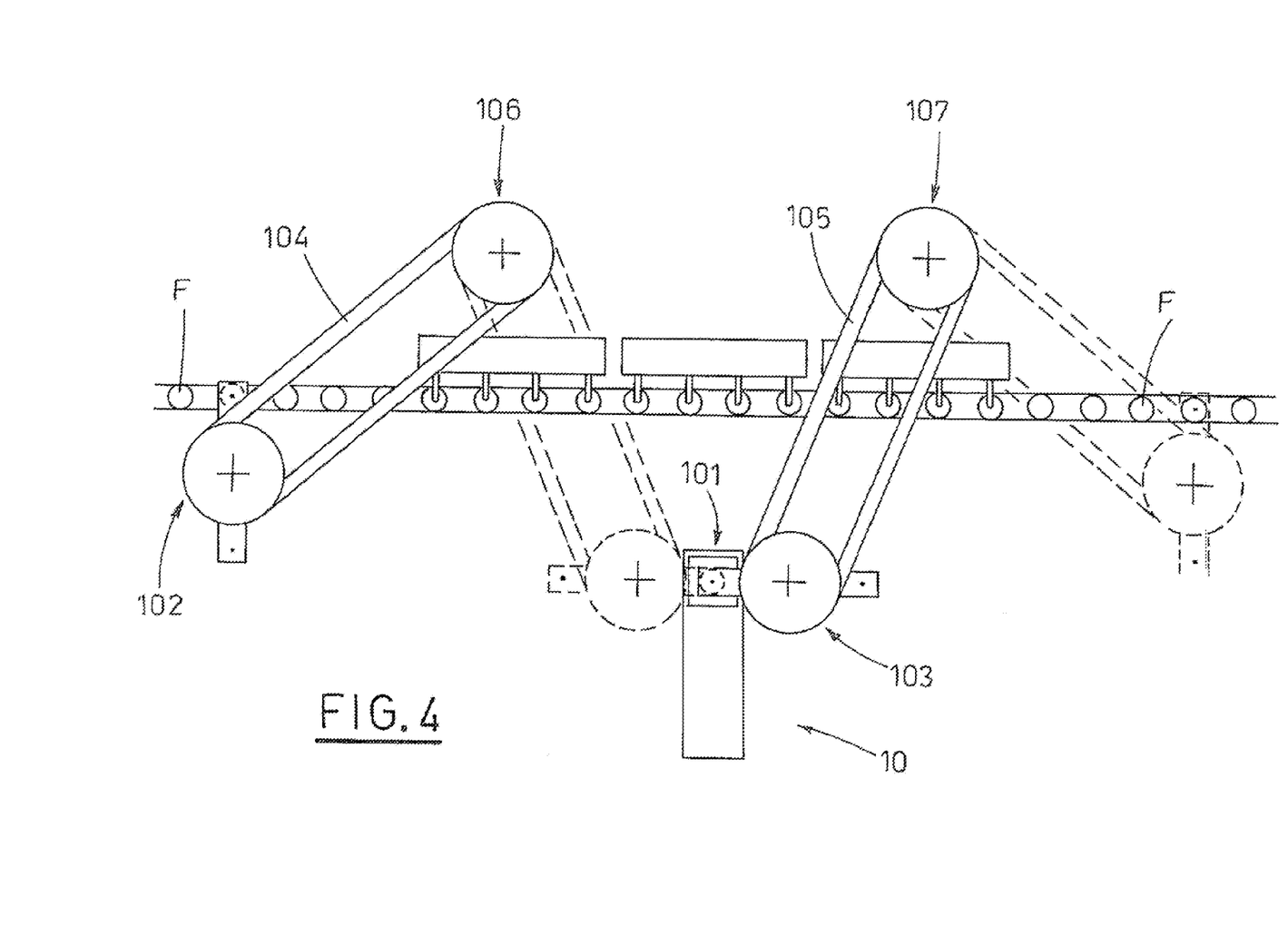
FIG. 4 is a plan view schematically illustrating a possible weighing station of the vials.

With the aim of guaranteeing a precise measuring of the product injected into the vials F, and the overall weight thereof when filled, the machine M of the invention further comprises a statistical weighing station 10 (FIGS. 1A, 1B, 4). The weighing station 10 is arranged adjacent to the operating line, in proximity of the filling station 8. In the step of weighing some vials F, collected at regular intervals from the operating line of the machine M, are weighed before and after the filling station 8, without interfering with the productive capacity of the plant. This operation is performed both such as to control with precision the quantity of product injected and such as to identify any eventual vials F that may not conform to the specifications and reject them when they arrive in proximity of the line outlet, as will be described in greater detail herein below (see patent application EP 06 003 691).

In the preferred embodiment of the invention (in accordance with document EP 1 988 018), illustrated in FIG. 4 of the drawings, the weighing station 10 of the machine M of the invention comprises a single scales 101 for weighing the vials F, situated in proximity of the operating line, on the opposite side with respect to the filling nozzles 81. The weighing station 10 further comprises a first and a second pick-up-and-place member 102, 103 of vials F, the first member 102 for picking up a single vial F upstream of the filling station 8, transferring it to the weighing scales 101 and reintroducing in onto the line upstream of the filling station 8, once the tare has been measured; the second member 103 for picking up a single vial F, the tare of which has been previously weighed downstream of the filler station 8, transferring it to the weighing scales 101 and reintroducing it into the line once the gross weight has been measured. The above-mentioned first and second pick-up-and-place members 102, 103 of the vials F are activated in phase relation and are operated by two respective oscillating arms 104, 105 which constrain them to supports 106, 107. The supports 106, 107 are arranged in proximity of the line on the opposite side with respect to the scales 101, respectively before and after the filing station 8. The supports 106, 107 enable rotation of the oscillating arms 104, 105 on a horizontal plane, by means of a motor organ (not illustrated), enabling displacement of the first and second pick-up and place member 102, 103 of the vials F. Clearly, once gross weights and tares of the vials F have been taken, the net weight thereof is calculated, i.e. the weight of the liquid solution introduced.

Following their filling, the full vials F advance in order to be sealed in a capping station 11 (FIGS. 1A, 1B, 5, 5A, 6). In particular, the capping station 11 of the machine M is such as not to compromise the sterility of the vials F.

It is known that the most widely-used type of caps for vials F is mushroom-shaped. These caps essentially comprise a head portion (the "hat" of the mushroom) which is destined to remain outside the vial F even after capping, and an inserting portion (stalk), narrower than the head portion, conformed such as to enter the mouth of the vials F.

The capping station 11 does not comprise interaction between the means and the inserting portion of the caps, but only with the relative head portion.

It is therefore advantageous for the sterility of the vials F that the inserting portion of the caps, conformed in order at least partly to be introduced into the vials F, is not touched. In a case of filling and capping vials F for freeze-dried products, the liquid of the liquid solution containing particles in suspension is evaporated after, and for this reason the cap is inserted only partially in the mouth of the vial F. In this case, the stalk of the cap externally exhibits a groove which is sealed once the liquid has evaporated.

There follows a description in greater detail of the structure of the above-cited capping station 11, in a preferred embodiment thereof illustrated in the accompanying figures of the drawings.

Figures 5, 5A:
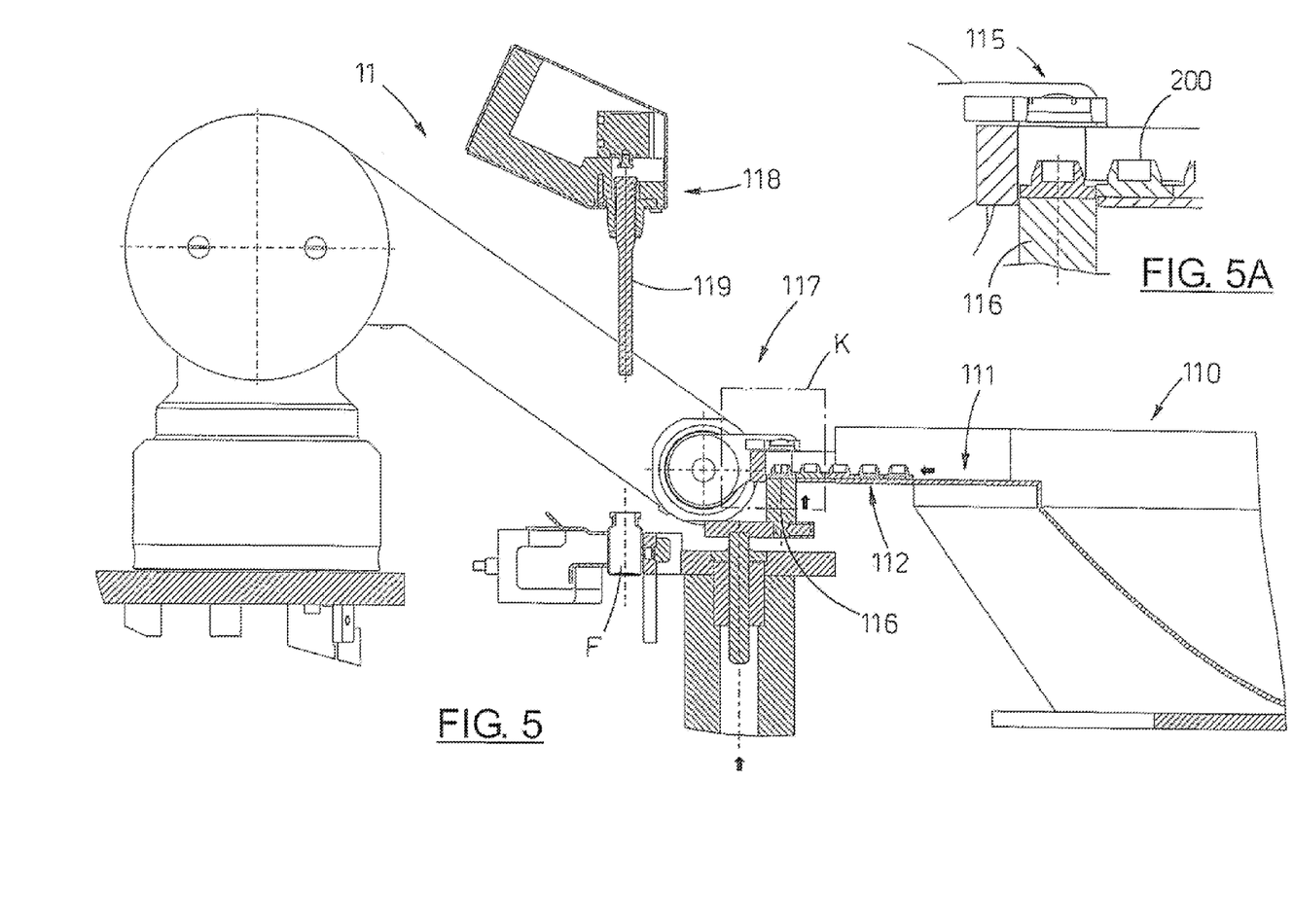
FIG. 5 is a lateral view, with parts in section and others removed, of the capping station of the machine of the invention.
FIG. 5A is a large-scale view of detail K of FIG. 5.
Figure 6:
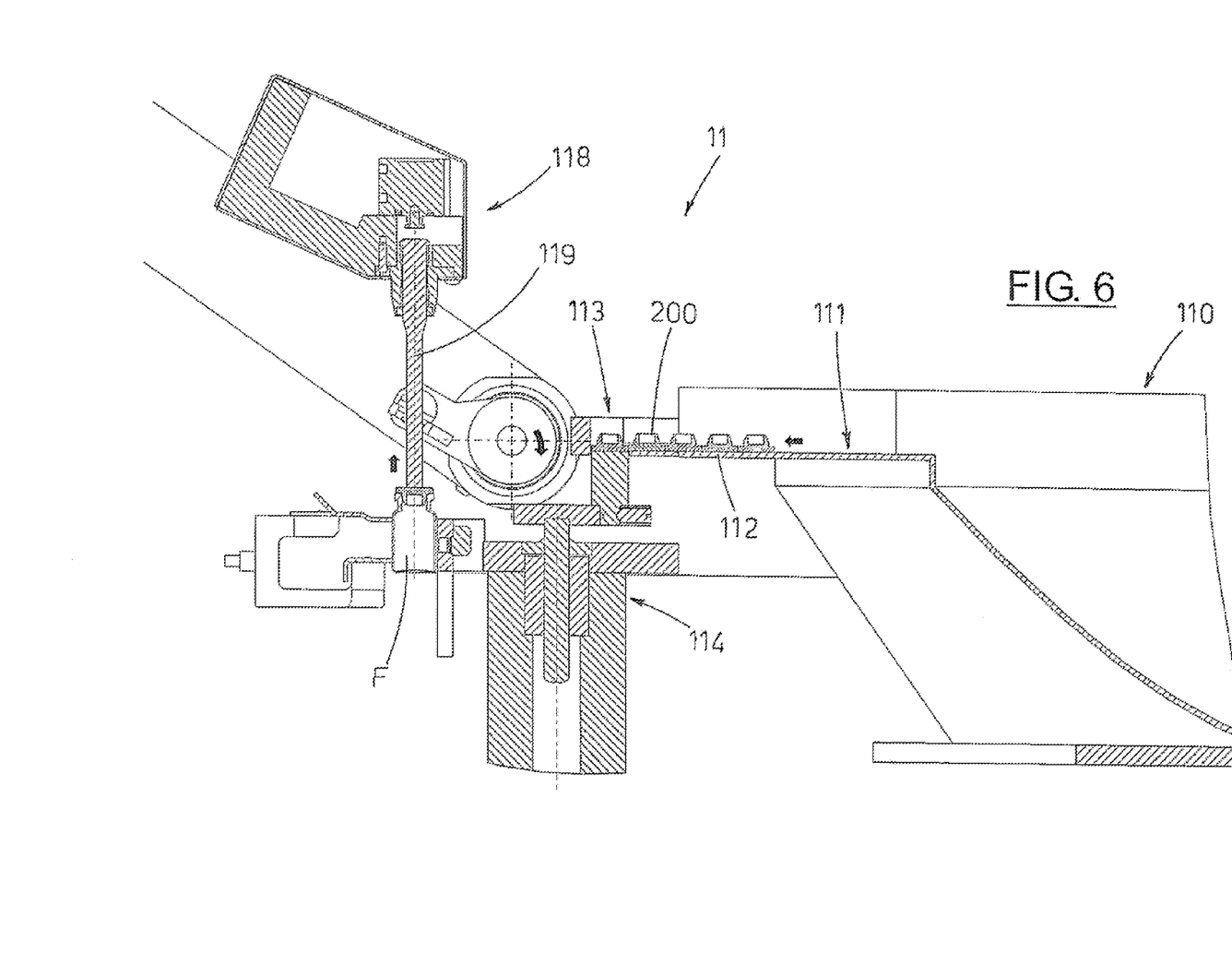
FIG. 6 is a further lateral view of the capping station in an operative configuration that is different from the configuration of FIG. 5.

With particular reference to FIGS. 5, 5A and 6, the capping station 11 comprises: a vibrator bin 110 for containing caps 200, contacting them only in the relative head portion; conveyor means 11 supplied with the caps 200 contained in the vibrator bin 110, conformed such as to contact only the head portions thereof; means for picking up and inserting 117, conformed such as to contact the caps (200) only in the respective head portion, and such as to insert at least a part of an insertion portion of the cap 200 into the mouth of the vials F.

The caps 200 are predisposed in the vibrator bin 110, facing with the inserting portion (stalk) pointing upwards, contacting the bin 110 only with the head portion thereof. The vibrator bin 110, when activated, directs the caps 200 towards the conveyor means, comprising a specially-arranged linear vibrator 112. The linear vibrator 112 is conformed such as to advance the caps 200 resting on the respective head portion, arranging them in a line.

The caps 200 proceed advancingly up until they reach a collecting zone 113, in which they stop, striking against a stop surface, forming various lines, four in the present case. At this point a collecting element 114 is activated, which is destined to collect four caps 200, i.e. the head caps, from the line. Each cap 200 collected is transferred to a housing 115 conformed such as to receive and retain the cap 200 by its head portion. The housing 115, at the moment of receiving the cap 200, is arranged horizontally, superposed to the collecting point (FIG. 5A).

The collecting element 114 comprises a lift member 116, arranged at the collecting point, which supports a head portion of the caps 200, once striking against the abutting surface. The lift member 116 is vertically mobile such that when it has received the caps 200 it raises them such as to insert them in the relative housings 115. Each housing 115, which comprises at least a through-hole, is conformed such as to receive and retain the head portion of a cap 200 by interference.

The housing 115 can therefore be brought into a release position, situated above the mouth of a vial F, engaged between the tines of the centering comb 6. For this purpose, a transfer mechanism is included with enables the housing 115 to be moved from the first housing position to the second release position, and vice versa, describing an arched trajectory of 180 degrees. The housing 115, during the release step, is arranged in such a way that the inserting portion of the cap 200 faces the mouth of the respective vial F.

The above-described pick-up-and-place means 117 comprise at least a presser element 118, arranged in such a way that once activated it presses on only the head portion of a cap 200, engaged in the housing 115 with the inserting portion facing the mouth of a vial F. The presser element 188 essentially comprises a vertically-mobile cursor 119, having a lower end for contacting the head of the cap 200.

When the presser element 118 is activated, the mobile cursor 119 displaces vertically from above in a downwards direction, such that the lower end exerts, on the head portion of the cap 200, a force which is such as to separate it from the housing 115. In this way, the inserting portion of the cap 200 enters at least partially in the mouth of the underlying vial F. This step is schematically illustrated in FIG. 6.

The vials F, filled and capped, are transported by the comb conveyor 5 towards a second sector device 12 (see FIG. 1B).

The sector device 12 is conformed and functions exactly like the first sector device 4 arranged between the screw 3 and the comb conveyor 5, as previously described. In this case, the second sector device 12 is supplied by the comb conveyor 5 with which it is activated in phase relation, and is structured such as to receive the vials F in the seatings of one or the other cogged sector. At the moment in which the comb conveyor 5 translates longitudinally from left to right, a cogged sector of the sector device 12, for example the first sector, is in a position such as to receive vials F, rotating in the direction S at the same peripheral velocity of the comb conveyor 5, which translates contemporaneously in a longitudinal direction.

Figure 7:
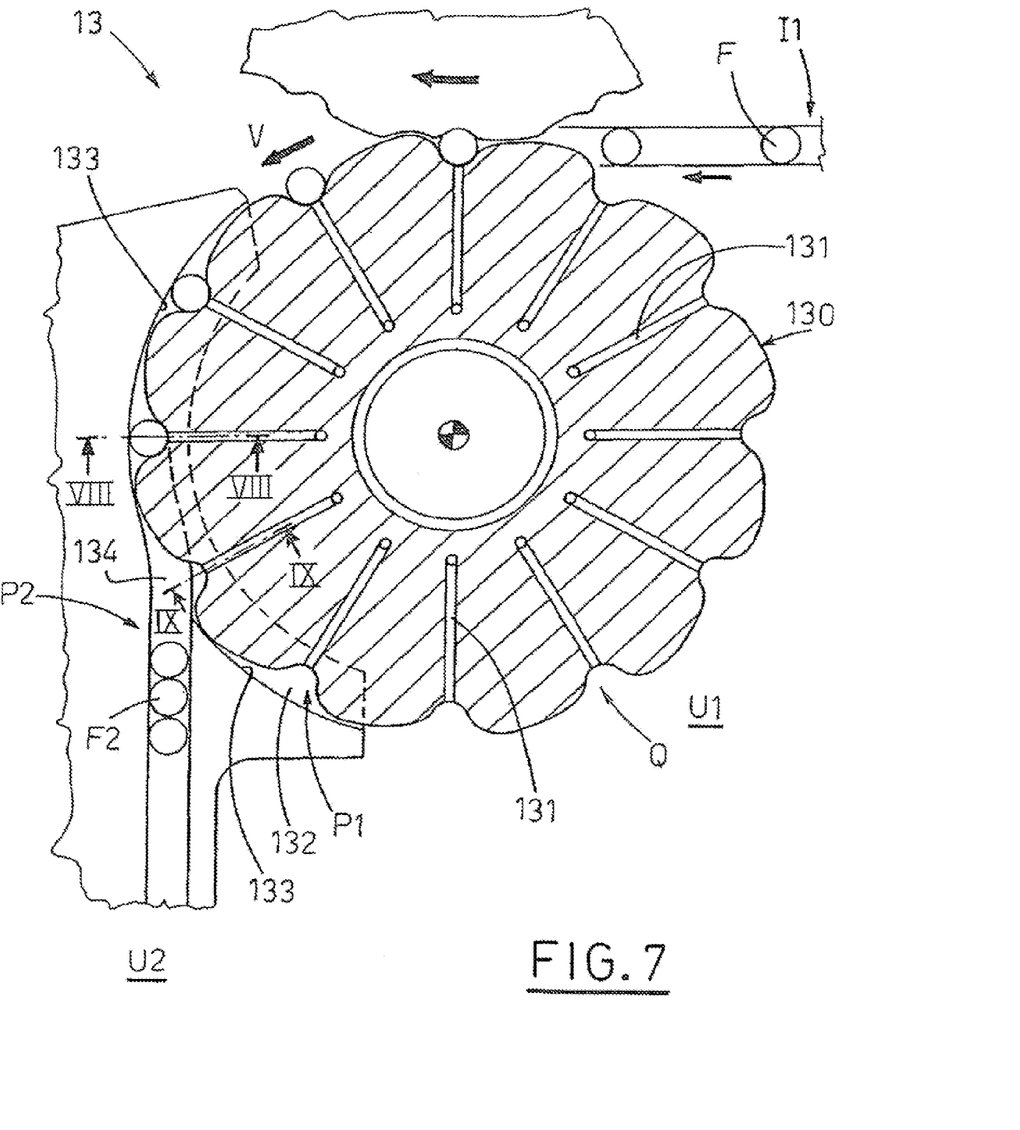
FIG. 7 is a schematic plan view of detail W of FIG. 1B.

When four vials F occupy the seatings of the first cogged sector, the cogged sector performs a rotation in a clockwise direction such as to transfer the vials F to a star device 13 especially arranged (detail W of FIG. 1B and FIG. 7). In the meantime the second cogged sector of the device 12 has rotated such as to be at the comb conveyor 5 position.

The star device 13 has the task of conveying the vials F towards one of the two outlets provided by the line, the first outlet U1 for conforming vials F1 and the second outlet U2 for defective vials F2. The star device 13 essentially comprises a selector disc 130 having a vertical rotation axis, which disc 130 exhibits on an external circumference thereof seatings Q conformed such as to receive the vials F. The seatings Q are connected to relative conduits 131 which can be placed under a depression by a depression source, external of the selector disc 130, not illustrated, following a command of special intercepting organs (also not illustrated).

The selector disc 130 is combined with a first guide track P1 of the vials F1 classified as conforming.

The first guide track P1, concentric to the selector disc 130, develops in a circular sector in rotation direction V indicated in the figures. The first guide track P1 comprises a sliding base 132, below the seatings Q, for receiving the vials F, and a lateral edge 133 arranged peripherally with respect to the selector disc 130 without obstructing rotation thereof. The first guide tract P1 develops from an inlet 11 to an outlet U1.

A second guide tract P2 for the vials F2 considered defective departs tangentially to the disc 130 and to the first tract P1. The sliding base 134 of the second guide tract P2 is lower than that of the tract P1. The lateral edge 133 of the latter is specially interrupted in the intersecting zone with the tract P2. The second track P2 develops distractingly from the selector disc 130 and terminates at an outlet U2 where the defective vials F2 are unloaded.

Figure 8:
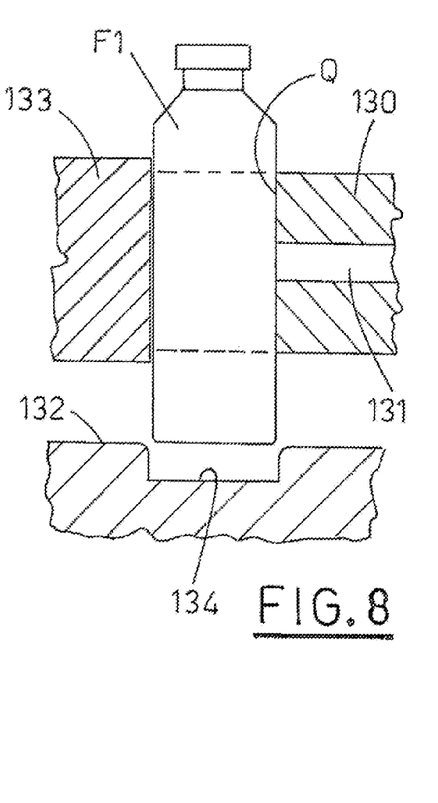
FIG. 8 is a view of section VIII-VIII of FIG. 7.
Figure 9:
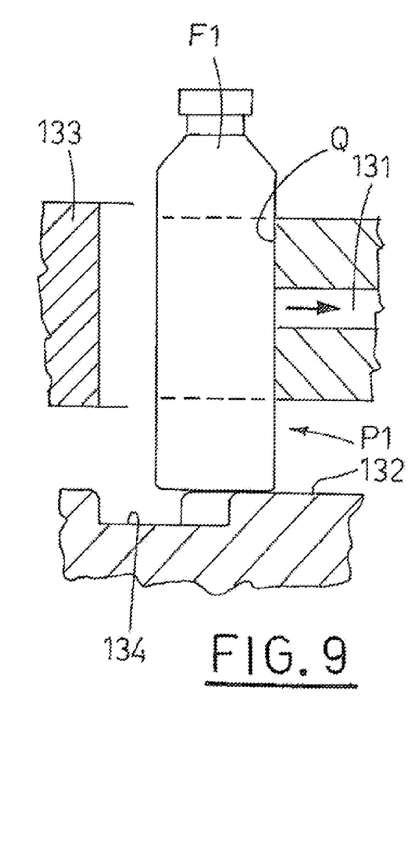
FIG. 9 is a view of section IX-IX of FIG. 7.

The vials F which reach the selector disc 130 have been previously subjected to the appropriate checks to establish whether they are conforming or not, with respect to predetermined specifications, such as for example the weight specification. Once engaged in the seatings of the disc 130, the vials F are already identified as conforming F1 or defective F2, and the intercepting organs are able to establish whether to activate or not the source of air through the conduits 131. In the case that a conforming vial F1 is being transported, it is retained by the source of air depression, which retains it in suspension, releasing it only once the intersection with the track P2 has been passed. The conforming vial F1 thus proceeds along the sliding base 132 of the tract P1 up to the outlet U1. This operation is schematically illustrated in FIGS. 8 and 9.

In the preferred embodiment, the outlet U1 is associated to a line arranged perpendicular to the longitudinal development direction of the machine M, such as to convey the vials considered conforming towards the back of the machine M (see FIG. 1A).

Figure 10:
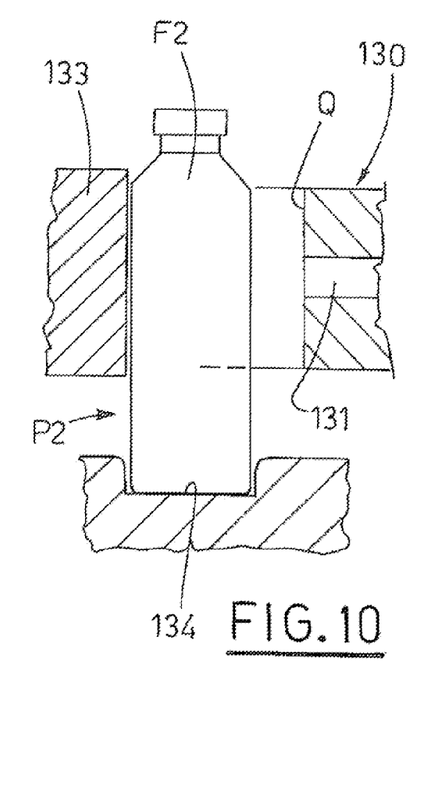
FIG. 10 is a view similar to that of FIG. 9 in a different operative situation.

In a case of a defective vial F2, however, transported by the star device 13, the aspirating current is interrupted when the vial F is in track P2, releasing the defective vial F2 (see FIG. 10), which distances from the disc and proceeds towards the outlet U2, along the sliding base 134 of the track P2.

The above-described machine can comprise some empty stations, arranged for example upstream of the first blower station 7 of inert gas and downstream of the second blower station 9 of inert gas, before the capping station 11, as shown in the accompanying figures of the drawings.

The first and second blower station of inert gas can be present or not in the machine, according to operating needs.

The above has been described by way of non-limiting example, and any eventual construction variants are understood to fall within the ambit of protection of the present technical solution, as described above and claimed in the following.

The invention claimed is:

1. A machine (M) for packing vials (F), wherein it comprises, arranged in a cascade fashion:
   a supply station (1) of empty vials (F);
   an Archimedes screw (3) having a rotation axis parallel to a longitudinal development of the machine (M), supplied with the vials (F) in arrival from the supply station (1), and destined to transfer the vials (F) to an outlet thereof, at a predetermined step;
   a first device (4) comprising at least two cogged sectors, with an equal step to the step of the screw (3), which at least two cogged sectors rotate on a same axis independently of one another, and are alternatively activated in phase relation with the screw (3), in order to receive a predetermined number of vials (F) from the screw (3);
   a comb conveyor (5), step-moved and designed to receive the vials (F) from one or another of the cogged sectors of the first device (4), consequently to a suitable phase relation between a velocity of the conveyor (5) and a peripheral velocity of the corresponding cogged sector;
   a filling station (8), designed for introduction of a liquid solution contemporaneously into a plurality of vials (F), which plurality is equal in number to the predetermined number of vials (F);
   a statistical weighing station (10) of the vials (F), arranged in proximity of the filling station (8), able to detect a tare and a gross weight of sample vials (F) of the vials (F);
   a capping station (11), for at least partly sealing a plurality of vials (F) which plurality is equal to the predetermined number of vials (F);
   a second sector device (12), conformed like the first device (4), in which at least two cogged sectors are alternatively activated in phase relation with the movement of the comb conveyor (5);
   a star device (13), activated in phase relation with the movement of the cogged sector of the second device (12), which star device (13) is interested by the predetermined number of vials, and exhibits a double outlet, a first outlet (U1) and a second outlet (U2); the star device (13) being destined to direct conforming vials (F1) towards the first outlet (U1), and to reject vials (F2) which do not conform to determined requisites and to convey them towards the second outlet (U2).

2. The machine of claim 1, wherein the outlet of the supply station (1) forms a longitudinal channel (2) having dimensions such as to arrange the vials (F) in a line, supplied to the screw (3).

3. The machine of claim 1, further comprising a first blower station (7) for blowing an inert gas internally of the empty vials (F), arranged upstream of the filling station (8) of the vials (F).

4. The machine of claim 3, further comprising a second blower station (9) for blowing an inert gas internally of the full vials (F), which second blower station (9) is arranged downstream of the filler station (8) and upstream of the capping station (10).

5. The machine of claim 1, wherein the capping station (10) is configured to interact exclusively with a head portion of the caps (200) in order to at least partly seal the vials (F) and comprises:
- a vibrator bin (110) for containing the caps (200), contacting the caps (200) only in respective head portions thereof;
- conveyor means (111) supplied with the caps (200) arranged in the vibrator bin (110), configured to contact only the head portions thereof;
- means for picking up and inserting (117), configured to contact the caps (200) only in the respective head portion, and to insert at least a part of an insertion portion of the cap (200) into the mouth of the vials (F).

6. The machine of the claim 5, wherein the conveyor means (111) comprise at least a linear vibrator (112) for bringing the caps (200) into a resting position on the head portion thereof, the linear vibrator (112) being configured to advance the caps (200) up to a stop surface.

7. The machine of claim 5, wherein the capping station (10) comprises a housing (115) which in turn comprises at least a through-hole, delimited by surfaces for receiving and retaining the caps (200) by the head portion thereof.

8. The machine of claim 5, wherein the means for picking up and inserting comprise at least a presser element (118), arranged to press, once activated, only on the head portion of a cap (200), the presser element comprising a vertically-mobile cursor (119), having a lower end for contacting the head portions of the caps (200).

9. The machine of claim 1, wherein the star device (13) comprises:
- a vertical-axis selector disc (130), exhibiting seatings (Q) for receiving the vials, which seatings (Q) cooperate with depression means;
- a first track (P1) concentric to the selector disc (130) which extends from an inlet (11) to the first outlet (U1) and a second track (P2) which intersects the first tract (P1) and extends towards the second outlet (U2).

10. The machine of claim 9, wherein the second tract (P2) of the star device (13) is situated at a lower level than the first tract (P1), with the aim of rejecting vials (F2) which do not conform to determined requisites, and to convey them to the second outlet (U2), following deactivation of the depression means.

* * * * *